US008284630B2

(12) United States Patent
Ferber

(10) Patent No.: US 8,284,630 B2
(45) Date of Patent: Oct. 9, 2012

(54) ANNULAR-SUM TRANSFORM OF IRREGULARLY SAMPLED SEISMIC DATA

(75) Inventor: Ralf G. Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 484 days.

(21) Appl. No.: 12/473,359

(22) Filed: May 28, 2009

(65) Prior Publication Data

US 2010/0302904 A1 Dec. 2, 2010

(51) Int. Cl.
*G01V 1/16* (2006.01)
*G01V 1/28* (2006.01)

(52) U.S. Cl. ............... 367/59; 367/38; 367/62; 367/63

(58) Field of Classification Search ............... 367/38, 367/43, 59, 62, 63
See application file for complete search history.

(56) References Cited

U.S. PATENT DOCUMENTS

| 6,625,543 | B1 * | 9/2003 | Bevc et al. ............... 702/14 |
| 7,382,685 | B2 | 6/2008 | Ferber et al. |
| 7,499,374 | B2 | 3/2009 | Ferber |
| 2006/0018191 | A1 * | 1/2006 | Kappius et al. ............... 367/38 |
| 2007/0025182 | A1 * | 2/2007 | Robertsson ............... 367/18 |
| 2008/0225642 | A1 | 9/2008 | Moore et al. |

OTHER PUBLICATIONS

PCT Search Report, dated Nov. 26, 2010, Application No. PCT/US2010/030550.
Margrave, et al., The Annular-sum and Hale-McClellan Methods of 3D Wavefield Extrapolation, CREWES Research Report, 2006, pp. 1-25, vol. 18.

* cited by examiner

*Primary Examiner* — Eric Bolda

(57) ABSTRACT

A method for interpolating irregularly sampled seismic data, including receiving seismic data acquired at irregularly spaced seismic sensors in a survey area, defining a plurality of regularly spaced locations in the survey area, forming an annular ring around one of the plurality of regularly spaced locations, and interpolating the seismic data inside the annular ring to estimate seismic data that would have been acquired at the one of the plurality of regularly spaced locations.

20 Claims, 6 Drawing Sheets

ANNULAR-SUM TRANSFORM OF IRREGULARLY SAMPLED SEISMIC DATA

BACKGROUND

1. Field of the Invention

Implementations of various technologies described herein generally relate to seismic data processing, and more particularly, seismic data processing of irregularly sampled seismic data.

2. Description of the Related Art

The following descriptions and examples do not constitute an admission as prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wave field may be sampled by a plurality of seismic sensors, such as geophones, hydrophones and the like. Each sensor may be configured to acquire seismic data at the sensor's location, normally in the form of a seismogram representing the value of some characteristic of the seismic wave field against time. The acquired seismograms or seismic data may be transmitted wirelessly or over electrical or optical cables to a recorder system. The recorder system may then store, analyze, and/or transmit the seismograms. This seismic data may be used to detect the possible presence of hydrocarbons, changes in the subsurface and the like.

In some circumstances, the sampled seismic data may be acquired at irregular locations. That is, the seismic data may be acquired from locations which were not planned to be sampled. For example, seismic data may be planned to be sampled in a first location. However, an obstacle (e.g., a building) may be located on top of the first location. Consequently, a sensor or receiver may not be placed at the planned first location. Therefore, the sensor may have to be placed in a second location that is close to the first location, but is not the same as the planned location. This second location may be referred to as an irregular location. Many receivers may acquire seismic data at irregular locations, thereby resulting in irregularly spaced seismic data.

After acquiring sampled seismic data, the seismic data may be processed using specific signal-processing algorithms. For example, Fourier transforms may be applied to the seismic data. The signal-processing algorithms may require the seismic data to be located at regularly spaced locations. For example, the algorithms may require the seismic data to be located at the nodes of a regularly spaced grid (e.g., a Cartesian grid). If the seismic data is not located at regularly spaced locations, the results of the signal-processing algorithms may be inaccurate or distorted. Consequently, using irregularly sampled seismic data may result in inaccurate or distorted results.

One solution to the problem of having seismic data at irregularly spaced locations while the seismic data is needed at regularly spaced locations is to use the seismic data at the irregularly spaced locations to estimate the seismic data at regularly spaced locations. Obtaining seismic data at regular locations from seismic data which was measured at irregular locations is commonly referred to as re-sampling or interpolation. The process of interpolating or re-sampling seismic data onto a regular grid from seismic data sampled at irregular locations is called regularization or gridding. Regularization of seismic data is often a very important pre-processing step for several seismic data processing algorithms, including 3-dimensional surface-related multiple attenuation (SRME), migration and 4-dimensional survey matching. Although the aforementioned interpolation techniques allowed for estimation of seismic data from irregularly spaced samples, the interpolated seismic data still suffers from the effects of noise.

SUMMARY

Described herein are implementations of various technologies for a method for interpolating irregularly sampled seismic data (i.e. especially seismic data sampled irregularly in space) with an annular-sum transform technique.

In one implementation, the method may include including receiving seismic data acquired at irregularly spaced seismic sensors in a survey area, defining a plurality of regularly spaced locations in the survey area, forming an annular ring around one of the plurality of regularly spaced locations, and interpolating the seismic data inside the annular ring to estimate seismic data that would have been acquired at the one of the plurality of regularly spaced locations.

In another implementation, after defining the plurality of regularly spaced locations in the survey area as described above, the method may include forming a circle around one of the plurality of regularly spaced locations to create an annular ring, defining an outer limit of the annular ring as the radius of the circle plus a half width of the annular ring, defining an inner limit of the annular ring as the radius of the circle minus the half width of the annular ring, and interpolating the portion of the acquired seismic data inside the annular ring to estimate seismic data that would have been acquired at the one of the plurality of regularly spaced locations.

In yet another implementation, after forming the annular ring around one of the plurality of regularly spaced locations as described above, the method may include forming two or more equal sized segments inside the annular ring, defining two or more centers inside the two or more segments, defining a range for each center, normalizing the seismic data inside each range, computing a sum of the normalized seismic data inside each range, assigning each sum of the normalized seismic data to the center of the corresponding segment, computing a sum of all the centers in the annular ring, computing a product between the sum of the centers and a filter weight, and determining that the resulting product corresponds to the seismic data received at the one of the plurality of regularly spaced locations.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at interpolating irregularly sampled seismic data with an annular-sum transform technique.

Annular-sum transforms of irregularly sampled seismic data may be used to filter or estimate a regularly sampled seismic data set from an irregularly sampled seismic data set. The annular-sum transform may create a filtered trace or seismogram at a specified location within the irregularly sampled seismic data set. The annular-sum transforms may then be used in certain algorithms to accurately process the seismic data received by one or more receivers in a seismic survey area. In one implementation, the annular-sum transform may be created using a generalized Radon transform such that circles may be used as summation curves for the Radon transformation. The annular-sum transforms may then be used for wavefield extrapolation or other similar applications for processing seismic data.

One or more implementations of various techniques for interpolating irregularly sampled seismic data with an annular-sum transform technique will now be described in more detail with reference to FIGS. 1-6 in the following paragraphs.

Figure 1:
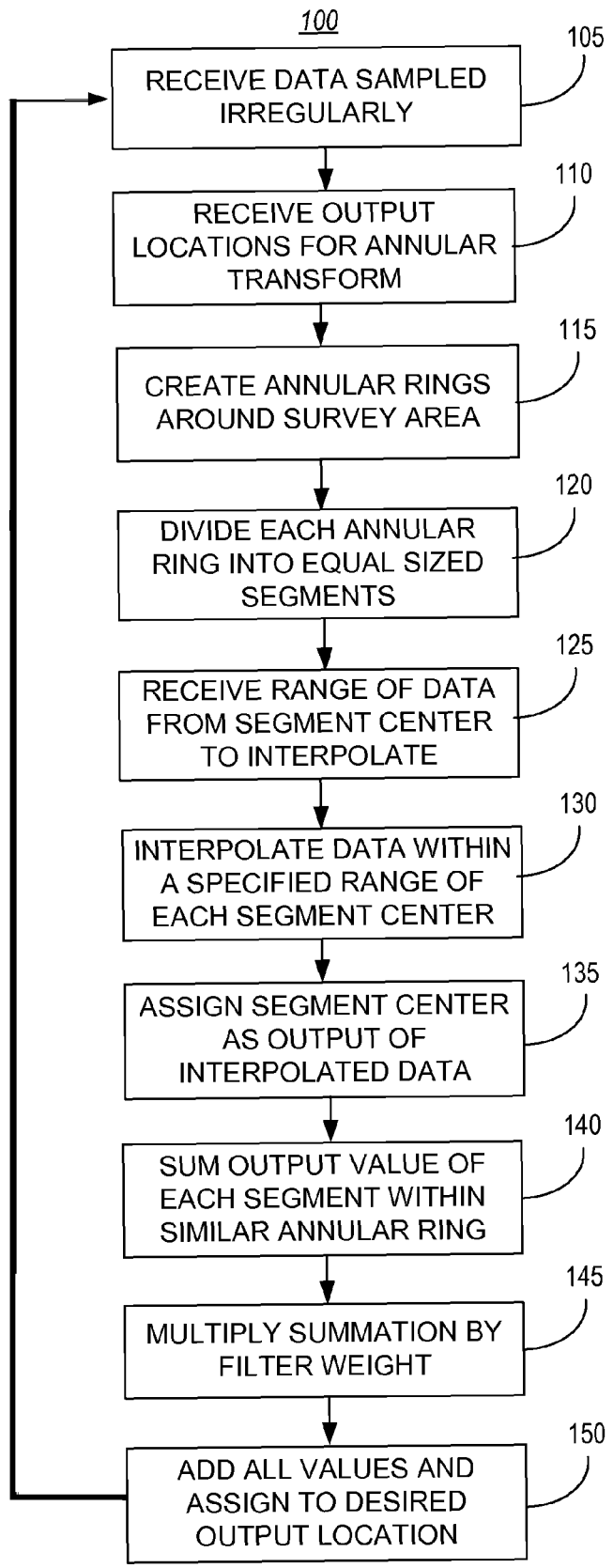
FIG. 1 illustrates a flow diagram of a method for interpolating irregularly sampled seismic data with an annular-sum transform technique in accordance with one or more implementations of various techniques described herein.

FIG. 1 illustrates a flow diagram of a method 100 for interpolating irregularly sampled seismic data with an annular-sum transform technique in accordance with one or more implementations of various techniques described herein. The following description of method 100 is made with reference to the schematic diagrams illustrated in FIGS. 2-5 in accordance with one or more implementations of various techniques described herein. Additionally, it should be understood that while the operational flow diagram indicates a particular order of execution of the operations, in some implementations, certain portions of the operations might be executed in a different order.

At step 105, irregularly sampled seismic data (or seismograms) may be received from one or more corresponding irregularly spaced receivers or seismic sensors placed in a seismic survey area. In one implementation, each receiver may record seismic data as it occurs at its respective location.

Ideally, the receivers may be installed at regular distances apart from each other in order to obtain regularly sampled seismic data. However, since seismic survey areas may not consist of a uniform terrain, one or more obstacles on the terrain may cause the receivers to be located at irregular distances apart from each other. An illustration of an arrangement of irregularly spaced receivers in a seismic survey area is detailed in FIG. 2.

Figure 2:
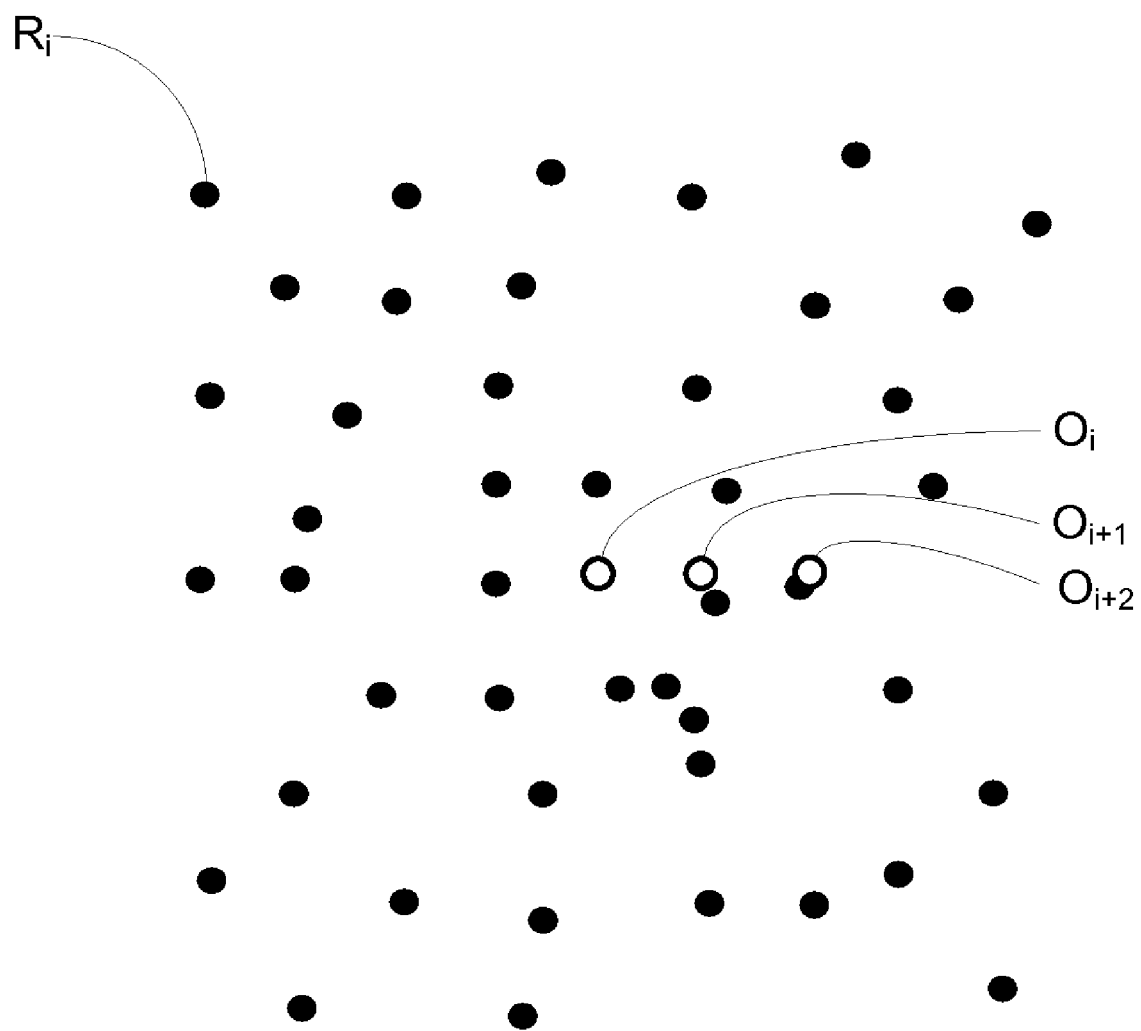
FIG. 2 illustrates a schematic diagram describing an arrangement of irregularly spaced receivers in a seismic survey area in accordance with implementations of various techniques described herein.

FIG. 2 illustrates a schematic diagram describing an arrangement of irregularly spaced receivers in a seismic survey area 200 in accordance with implementations of various techniques described herein. In one implementation, the arrangement of receivers may include one or more receivers $R_i$ and a specified output location $O_i$. The receivers $R_i$ may include seismic sensors disposed at a certain location on the Earth in the seismic survey area 200. The receivers $R_i$ may be disposed on land or water and may be capable of recording seismic waves and other seismic activities that may occur at its respective location.

The specified output location $O_i$ may correspond to the location within the seismic survey area 200 that may be specified by a user as a location to create or estimate an output trace using the annular-sum technique described in method 100. In one implementation, the specified output location $O_i$ may correspond to the location of a particular receiver $R_i$, but it should be noted that in some implementations the specified output location $O_i$ may not correspond with the location of a receiver $R_i$.

Referring back to FIG. 1, at step 110, one or more locations within the seismic survey area 200 may be specified by a user as output locations ($O_i$, $O_{i+1}$ . . . ) to be filtered or estimated using the annular-sum technique. The output locations $O_i$ may be specified for the seismic area 200 such that each output location $O_i$ may be regularly spaced between each other (e.g., in a rectangular grid). For example, a first output location $O_i$ may be located 3 meters west of a second output location $O_{i+1}$, and a third output location $O_{i+2}$ may be located 3 meters east of the second output location $O_{i+1}$, etc. The output locations $O_i$ may continuously be added to the seismic area 200 in a similar manner until output locations $O_i$ are defined at regularly spaced intervals to create a regularly spaced seismic data sample.

Figure 3:
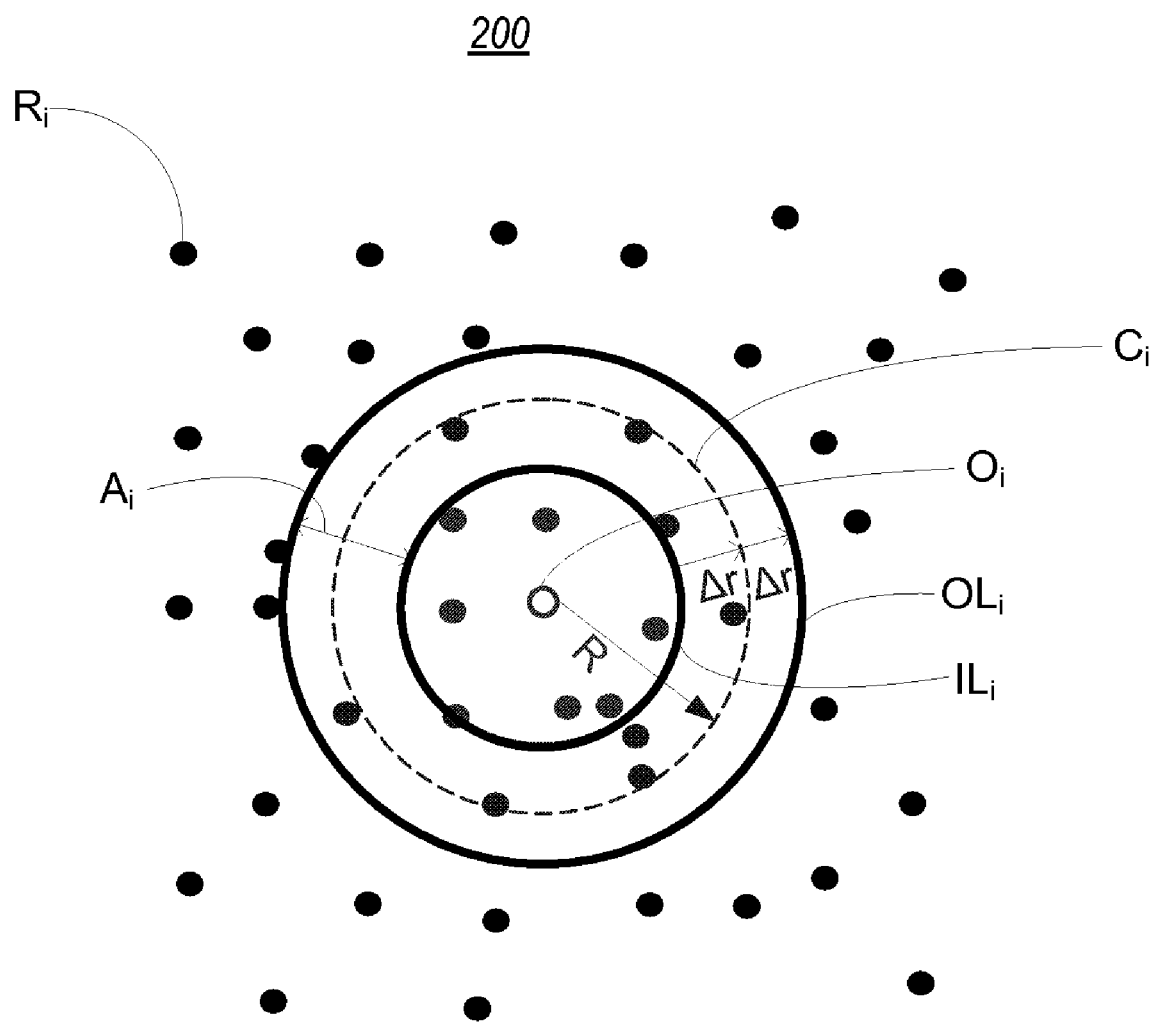
FIG. 3 illustrates a schematic diagram describing an arrangement of receivers in a seismic survey area with annular rings in accordance with implementations of various techniques described herein.

At step 115, one or more annular rings $A_i$ may be generated around the irregularly spaced receivers, as illustrated in FIG. 3.

FIG. 3 includes a schematic diagram describing an arrangement of receivers in the seismic survey area 200 with annular rings $A_i$ in accordance with implementations of various techniques described herein. In one implementation, the arrangement of receivers may include one or more receivers $R_i$, a specified output location $O_i$, one or more circles $C_i$, and one or more annular rings $A_i$. The receivers $R_i$ and the output location $O_i$ correspond to the descriptions provided in FIG. 2.

Referring back to FIG. 1, at step 115, the first annular ring $A_i$ may be generated by defining a circle $C_i$ with a specified radius R around a first output location $O_i$ such that the first output location $O_i$ is the center of the circle $C_i$. The outer limit $OL_i$ of the first annular ring $A_i$ may have a radius equal to the radius R of the circle $C_i$ plus a half-width $\Delta r$ of the first annular ring $A_i$, and the inner limit $IL_i$ of the first annular ring $A_i$ may have a radius equal to the radius R of the circle $C_i$ minus a half-width $\Delta r$ of the first annular ring $A_i$. In one implementation, the half-width $\Delta r$ may be determined based on the size of the seismic survey area 200. In another implementation, the radius R may be determined based on the total number of receivers $R_i$ in the seismic survey area 200. The annular ring $A_i$ may be defined as an area between the outer limit $OL_i$ and the inner limit $IL_i$ around the output location $O_i$. Although in this implementation the annular rings $A_i$ have been described as being circles, it should be noted that in some implementations the annular rings $A_i$ may be ellipses or other similar shapes.

Figure 4:
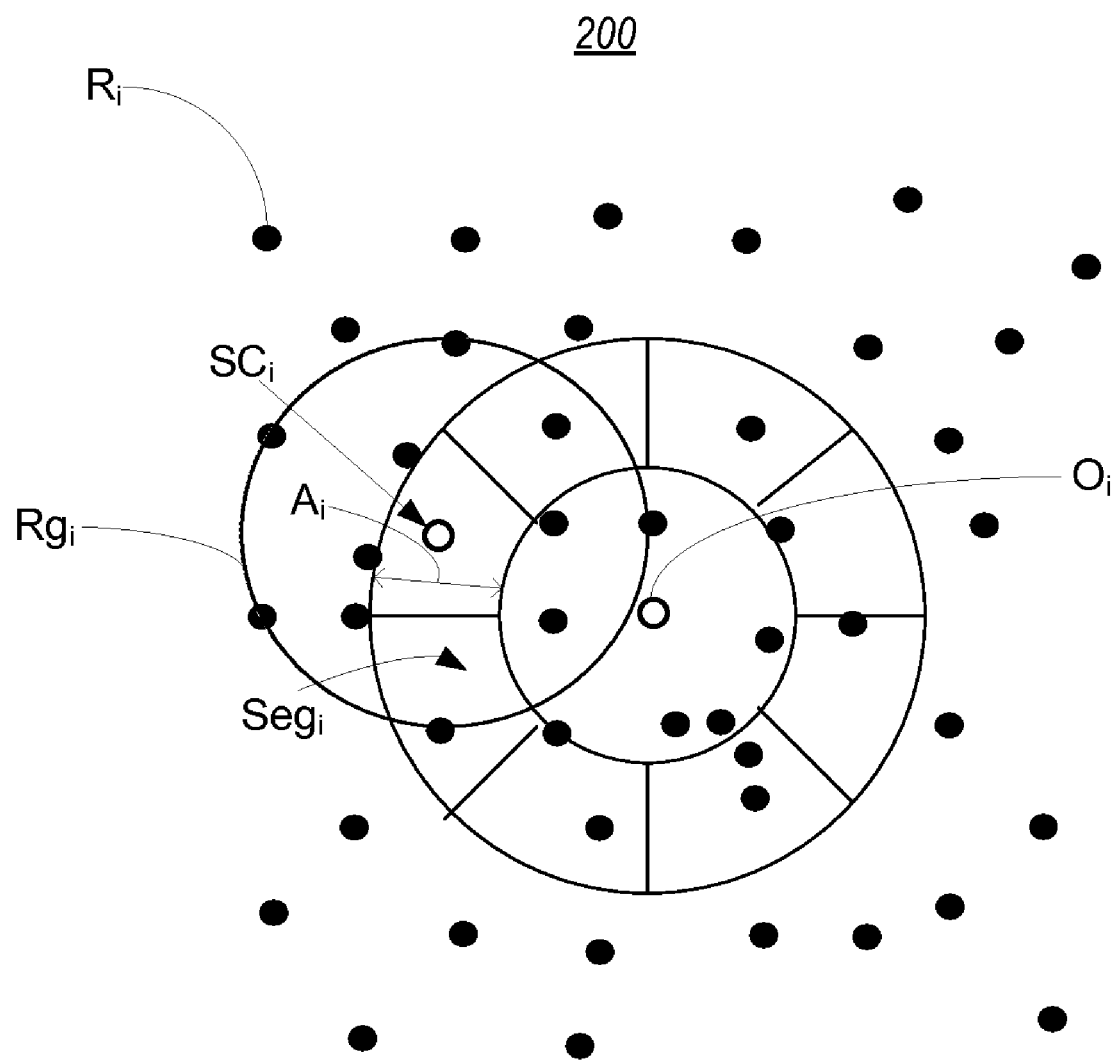
FIG. 4 illustrates a schematic diagram describing an arrangement of receivers in a seismic survey area with annular ring segments in accordance with implementations of various techniques described herein.

At step 120, the annular ring $A_i$ may be divided into two or more equal sized segments $Seg_i$ as illustrated in FIG. 4.

FIG. 4 illustrates a schematic diagram describing an arrangement of receivers in the seismic survey area 200 with annular ring segments $Seg_i$ in accordance with implementations of various techniques described herein. In one implementation, the arrangement of receivers may include one or more receivers $R_i$, a specified output location $O_i$, one or more annular rings $A_i$, two or more segments $Seg_i$, two or more segment centers $SC_i$, and two or more segment center ranges $Rg_i$. The receivers $R_i$, the output location $O_i$, the circles $C_i$, and the annular rings $A_i$ correspond to the descriptions provided in FIG. 2 and FIG. 3. Each segment $Seg_i$ may be used to compensate for distortion that may be resulting from the spatially irregularly sampled seismic data.

At step 125, a range $Rg_i$ or area around segment center $SC_i$ may be defined such that the seismic data from the receivers located within the area of the range $Rg_i$ may be interpolated into the segment center $SC_i$. The range $Rg_i$ may be defined as an area within a circle having a predetermined radius such that the seismic data from the receivers $R_i$ within the range $Rg_i$ area may be used to estimate the seismic data or trace that may have occurred at the segment center $SC_i$. As such, each segment center $SC_i$ may lie within the center of its corresponding segment $Seg_i$ or along the path of the circle $C_i$ as illustrated in FIG. 3.

At step 130, the seismic data received from the receivers $R_i$ within the range $Rg_i$ of each segment center $SC_i$ of the annular ring $A_i$ may be interpolated to determine a weighted sum of all of the seismic data within the range $Rg_i$ of the segment center $SC_i$. In one implementation, the interpolation of the seismic data may be completed by a stacking process which may involve the summation of the seismic data contained in a segment center range after the seismic data from each receiver has been normalized according to the number of seismic data samples contained within the segment. Although in this implementation a stacking process is used to interpolate the seismic data, it should be noted that alternative stacking schemes may also be used such as diversity stacking, median stacking, and the like. Furthermore, trimmed means of the seismic data per segment could be used to attenuate the influence of seismic data outliers (i.e., of seismic data samples considerably different from the average sample value). Alternatively, irregular interpolation schemes described in U.S. patent application Ser. No. 12/043,321, filed Mar. 6, 2008, titled INTERPOLATION OF IRREGULAR DATA may be used to interpolate the seismic data.

Figure 5:
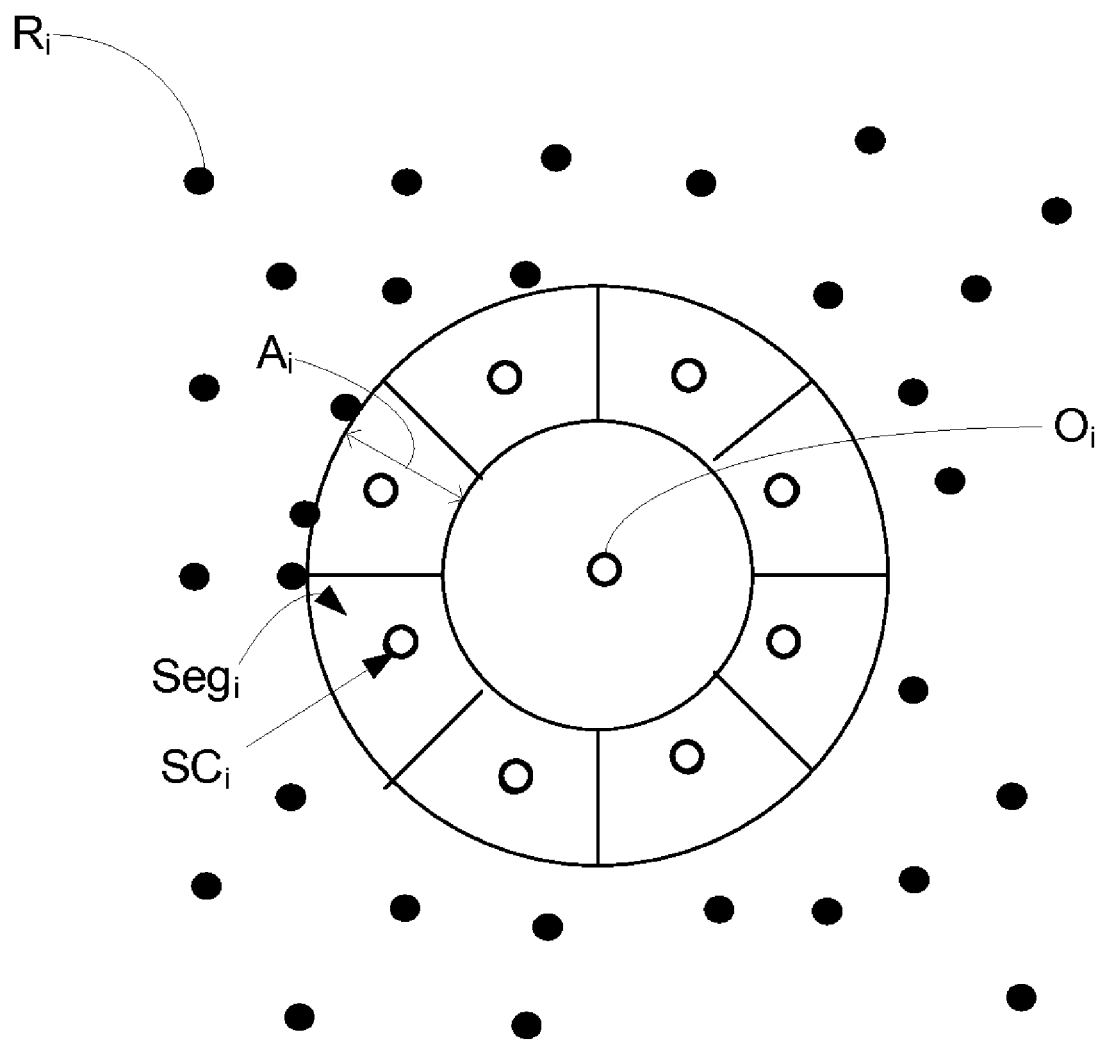
FIG. 5 illustrates a schematic diagram describing an arrangement of receivers in a seismic survey area with segment centers in accordance with implementations of various techniques described herein.

At step 135, the interpolated seismic data created at step 125 may be assigned to the segment center $SC_i$ such that all of the seismic data within the range $Rg_i$ of the segment center $SC_i$ may be consolidated into a single trace occurring at the segment center $SC_i$ as illustrated in FIG. 5.

FIG. 5 illustrates a schematic diagram describing an arrangement of receivers in the seismic survey area 200 with segment centers $SC_i$ in accordance with implementations of various techniques described herein. In one implementation, the arrangement of receivers may include one or more receivers $R_i$, a specified output location $O_i$, one or more annular rings $A_i$, two or more segments $Seg_i$, and one or more segment centers $SC_i$. The receivers $R_i$, the output location $O_i$, the annular rings $A_i$, the segments $Seg_i$, and the segment centers $SC_i$ correspond to the descriptions provided in FIG. 2, FIG. 3, and FIG. 4.

Referring back to FIG. 1, at step 135, the interpolation process may use the seismic data that may have been received from outside the annular ring $A_i$ to interpolate seismic data onto the segment center $SC_i$. In some implementations, one or more segments $Seg_i$ may not include a segment center $SC_i$ because seismic data may not exist within the corresponding segment $Seg_i$. As a result, the weight of the seismic data in the $SC_i$ of other segments $Seg_i$ within the same annular ring $A_i$ may be increased accordingly.

In another implementation, the segment centers $SC_i$ may represent the estimated seismic data or traces at a specific output location $O_i$ in the seismic survey area 200. Each segment center $SC_i$ may be assigned a corresponding interpolated seismic data created at step 130. Upon adding a segment center $SC_i$ to the segment $Seg_i$, the seismic data received from the receivers $R_i$ within the range $RG_i$ may be removed from the schematic diagram because their seismic data may now be represented by the segment center $SC_i$.

At step 140, the interpolated seismic data assigned to the each segment center $SC_i$ within the same annular ring $A_i$ may be summed together. In one implementation, the seismic data represented at the segment centers $SC_i$ within the same annular ring $A_i$ may be added together because they are each equidistant from the output location $O_i$ received at step 110.

At step 145, the resulting segment center summation from step 140 may be multiplied by a filter weight according to the annular ring $A_i$ in which the segment centers $SC_i$ may exist. In one implementation, the filter weight may be based on the distance between the segment center $SC_i$ and the output location $O_i$. In another implementation, step 145 may be omitted.

At step 150, the weighted segment centers received from step 140 may be added together to determine the annular-sum transform for the output location $O_i$. In one implementation, steps 105-150 may be repeated for a second output location $O_{i+1}$ defined in step 110 at a specified distance away from the previous output location $O_i$. Steps 105-150 may be continuously repeated until a seismic data set of regularly spaced seismic data is obtained.

In one implementation, the annular-sum transform may be created based on the seismic data along an annular ring $A_i$ without segmenting the area of the annular ring $A_i$. The seismic data along a single annular ring $A_i$ may include the seismic data received from one or more receivers $R_i$ that are located within the outer limit $OL_i$ and the inner limit $IL_i$ of the annular ring $A_i$ (see FIG. 3). The transformed seismic data may then be reduced to a 1-dimensional seismic data set, where the annular sum may represent a function of the radius of the annular summation ring.

In another implementation, if the seismic data received by the receivers $R_i$ in the seismic survey area 200 may be denoted as $\vec{x}' = (x_1, x_2)$, and the annular transform over an annular ring $A_i$ of "thickness" or width $2\delta$, may be mathematically expressed as:

$$\hat{D}(\vec{x}_0, r) = \oint_{r-\delta \leq |\vec{x}_0 - \vec{x}| \leq r+\delta} d\vec{x} \; D(\vec{x})$$

where $\hat{D}(\vec{x}_0, r)$ represents the output seismic data after filtering the irregular seismic data at the output location $O_i$ and where $$\oint_{r-\delta \leq |\vec{x}_0 - \vec{x}| \leq r+\delta} d\vec{x} \quad D(\vec{x})$$

represents the summation process of one or more annular rings $A_r$. In one implementation, the processing sequence as outlined in FIG. 1 discloses a method to evaluate such integrals from discrete and irregularly spaced seismic data.

Figure 6:
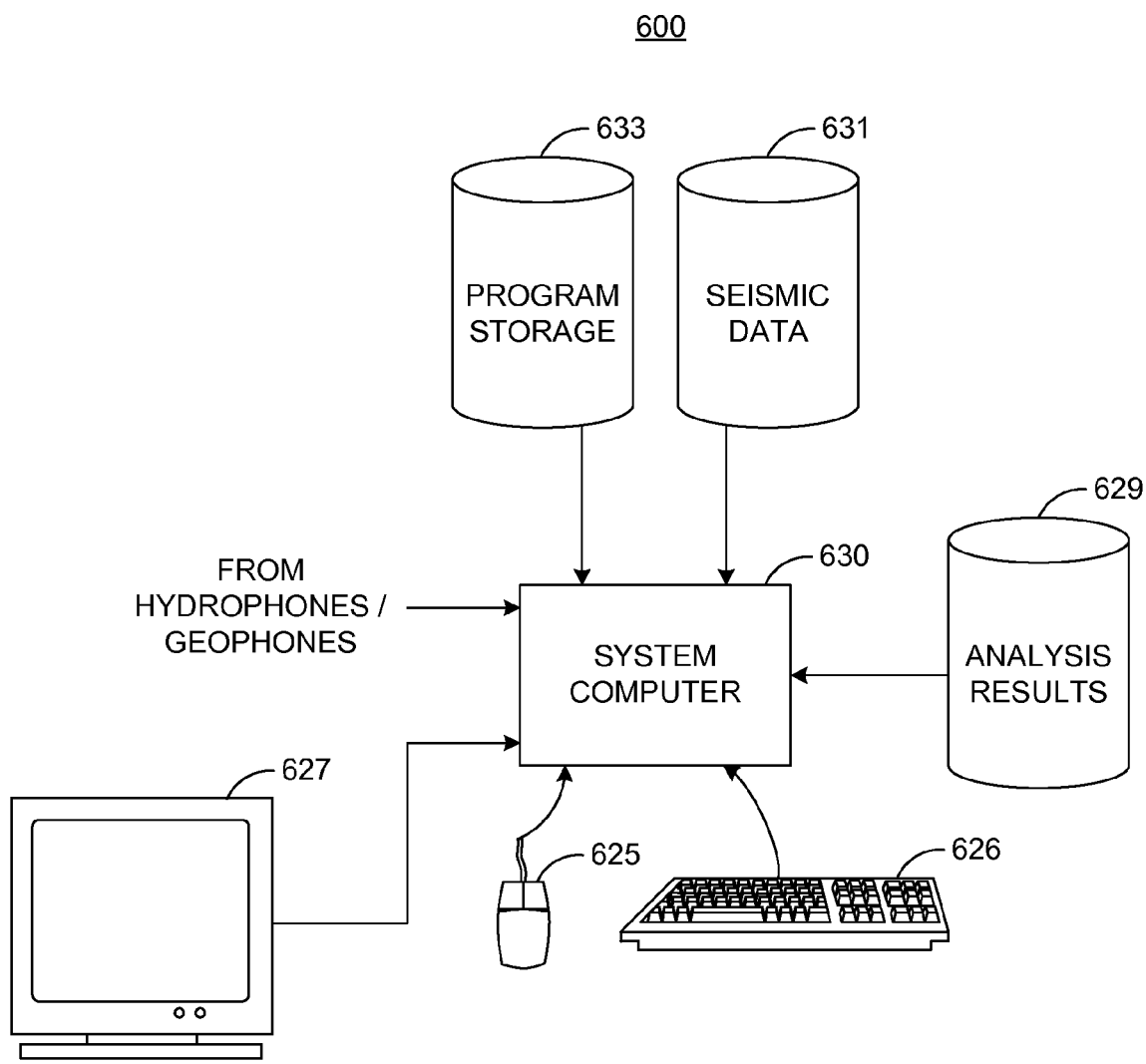
FIG. 6 illustrates a computer network into which implementations of various technologies described herein may be implemented.

FIG. 6 illustrates a computer network 600 into which implementations of various technologies described herein may be implemented. In one implementation, the method for interpolating irregularly sampled seismic data with an annular-sum transform technique as described in FIG. 1 may be performed on the computer network 600. The computer network 600 may include a system computer 630, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, seismic data from the receivers may be stored in disk storage device 631. The system computer 630 may retrieve the appropriate data from the disk storage device 631 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 633. Such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 630 may present output primarily onto graphics display 627. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 may be in communication with the receivers (either directly or via a recording unit, not shown), to receive signals indicative of the reflected seismic energy. After conventional formatting and other initial processing, these signals may be stored by the system computer 630 as digital data in the disk storage 631 for subsequent retrieval and processing in the manner described above. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for interpolating irregularly sampled seismic data, comprising:
   receiving seismic data acquired at irregularly spaced seismic sensors in a survey area;
   defining a plurality of regularly spaced locations in the survey area;
   forming an annular ring around one of the plurality of regularly spaced locations; and
   interpolating the irregularly spaced seismic data inside the annular ring to estimate seismic data that would have been acquired at the one of the plurality of regularly spaced locations.

2. The method of claim 1, wherein forming the annular ring comprises:
   forming a circle around the one of the plurality of regularly spaced locations, wherein the circle has a radius;
   defining an outer limit of the annular ring as the radius plus a half width of the annular ring; and
   defining an inner limit of the annular ring as the radius minus the half width of the annular ring.

3. The method of claim 2, wherein the radius is determined such that a portion of the irregularly spaced seismic data is inside the annular ring.

4. The method of claim 2, wherein the half width is determined such that a portion of the irregularly spaced seismic data is inside the annular ring.

5. The method of claim 1, wherein the annular ring is in the form of an ellipse.

6. The method of claim 1, wherein interpolating the irregularly spaced seismic data inside the annular ring comprises:
computing a sum of the irregularly spaced seismic data inside the annular ring; and
assigning the sum to the one of the plurality of regularly spaced locations.

7. The method of claim 1, wherein interpolating the irregularly spaced seismic data inside the annular ring comprises:
computing a sum of the irregularly spaced seismic data inside the annular ring;
computing a product between the sum of the irregularly spaced seismic data inside the annular ring and a filter weight; and
assigning the product to the one of the plurality of regularly spaced locations.

8. The method of claim 7, wherein the filter weight is based on the distance between the annular ring and the one of the plurality of regularly spaced locations.

9. The method of claim 1, further comprising:
forming two or more segments inside the annular ring, wherein the segments are equally sized;
defining two or more centers that correspond to the two or more segments;
defining a range for each center; and
interpolating the irregularly spaced seismic data inside the range to estimate seismic data that would have been acquired at each center.

10. The method of claim 9, wherein interpolating the irregularly spaced seismic data inside the range comprises:
normalizing the irregularly spaced seismic data inside the range;
computing a sum of the normalized seismic data inside the range; and assigning the sum to each center.

11. The method of claim 9, wherein interpolating the irregularly spaced seismic data inside the annular ring comprises:
computing a sum of the centers; and
assigning the sum of the centers to the one of the plurality of regularly spaced locations.

12. The method of claim 9, wherein interpolating the irregularly spaced seismic data inside the annular ring comprises:
computing a sum of the centers;
computing a product between the sum of the centers and a filter weight; and
assigning the product to the one of the plurality of regularly spaced locations.

13. The method of claim 9, wherein the range is defined as an area inside a circle that contains the irregularly spaced seismic data inside one of the segments.

14. A computer-readable storage medium having stored thereon computer-executable instructions which, when executed by a computer, cause the computer to:
receive seismic data acquired at irregularly spaced seismic sensors in a survey area;
define a plurality of regularly spaced locations in the survey area;
form a circle around one of the plurality of regularly spaced locations, wherein the circle has a radius such that a portion of the irregularly spaced seismic data is inside an annular ring;
define an outer limit of the annular ring as the radius plus a half width of the annular ring such that the portion of the irregularly spaced seismic data is inside the annular ring;
define an inner limit of the annular ring as the radius minus the half width of the annular ring; and
interpolate the portion of the irregularly spaced seismic data inside the annular ring to estimate seismic data that would have been acquired at the one of the plurality of regularly spaced locations.

15. The computer-readable storage medium of claim 14, wherein the computer-executable instructions which, when executed by a computer, cause the computer to interpolate the portion of the irregularly spaced seismic data inside the annular ring comprises computer-executable instructions which, when executed by a computer, cause the computer to:
form two or more segments inside the annular ring, wherein the segments are equally sized;
define two or more centers that correspond to the two or more segments;
define a range for each center, wherein the range includes the irregularly spaced seismic data inside one of the segments;
interpolate the irregularly spaced seismic data inside the range to estimate seismic data that would have been acquired at each center;
compute a sum of the centers; and
assign the sum of the centers to the one of the plurality of regularly spaced locations.

16. The computer-readable storage medium of claim 14, wherein the computer-executable instructions which, when executed by a computer, cause the computer to interpolate the portion of the irregularly spaced seismic data inside the annular ring comprises computer-executable instructions which, when executed by a computer, cause the computer to:
compute a sum of the portion of the irregularly spaced seismic data inside the annular ring;
compute a product between the sum of the portion of the irregularly spaced seismic data inside the annular ring and a filter weight; and
assign the product to the one of the plurality of regularly spaced locations.

17. The computer-readable storage medium of claim 16, wherein the filter weight is based on the distance between the annular ring and the one of the plurality of regularly spaced locations.

18. A computer system, comprising:
a processor; and
a memory comprising program instructions executable by the processor to:
receive seismic data acquired at irregularly spaced seismic sensors in a survey area;
define a plurality of regularly spaced locations in the survey area;
form an annular ring around one of the plurality of regularly spaced locations;
form two or more segments inside the annular ring, wherein the segments are equally sized;
define two or more centers that correspond to the two or more segments;
define a range for each center, wherein the range is defined as an area inside a first circle that contains the seismic data inside one of the segments;
normalize the seismic data inside the range;

compute a sum of the normalized seismic data inside the range;
assign the sum of the normalized seismic data to the center;
compute a sum of the centers;
compute a product between the sum of the centers and a filter weight; and
assign the product to the one of the plurality of regularly spaced locations.

19. The computer system of claim 18, wherein the program instructions executable by the processor to form an annular ring around one of the plurality of regularly spaced locations comprise program instructions executable by the processor to:

form a second circle around the one of the plurality of regularly spaced locations, wherein the second circle has a radius such that a portion of the acquired seismic data is inside the annular ring;
define an outer limit of the annular ring as the radius plus a half width of the annular ring such that a portion of the acquired seismic data is inside the annular ring; and
define an inner limit of the annular ring as the radius minus the half width of the annular ring.

20. The computer system of claim 18, wherein the annular ring is in the form of an ellipse.

\* \* \* \* \*